V. E. GOODWIN.
ELECTROLYTIC CELL.
APPLICATION FILED SEPT. 1, 1909.
987,622.
Patented Mar. 21, 1911.
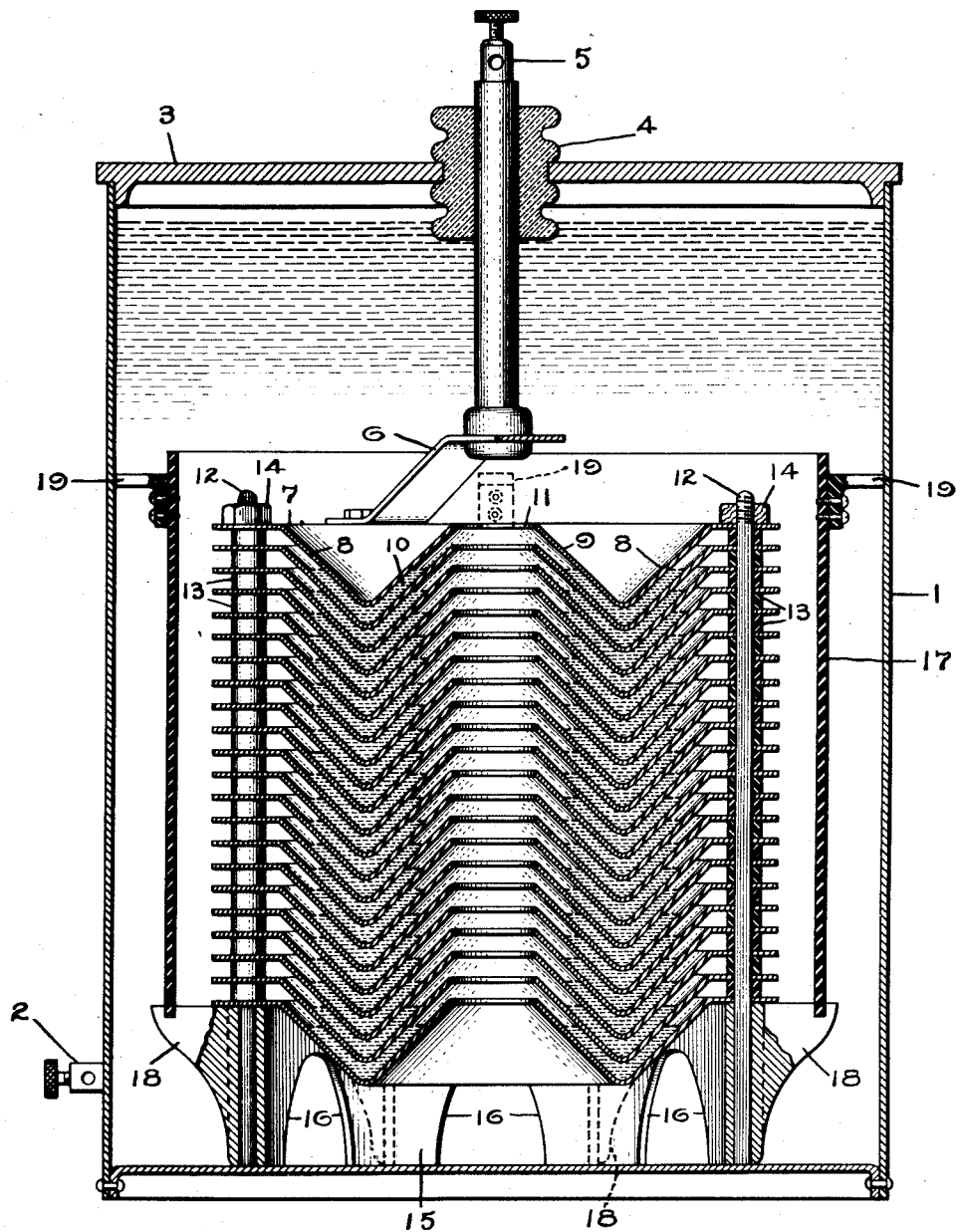
WITNESSES:
Lester H. Fulmer
Marcus L. Byng
INVENTOR
VICTOR E. GOODWIN.
BY Albert G. Davis
ATT'Y.

UNITED STATES PATENT OFFICE.

VICTOR E. GOODWIN, OF SCHENECTADY, NEW YORK, ASSIGNOR TO GENERAL ELECTRIC COMPANY, A CORPORATION OF NEW YORK.

ELECTROLYTIC CELL.

987,622.  Specification of Letters Patent.  Patented Mar. 21, 1911.

Application filed September 1, 1909. Serial No. 515,640.

*To all whom it may concern:*

Be it known that I, VICTOR E. GOODWIN, a citizen of the United States, residing at Schenectady, county of Schenectady, State of New York, have invented certain new and useful Improvements in Electrolytic Cells, of which the following is a specification.

My invention relates to electrolytic cells or condensers and more particularly to cells which have electrodes made of aluminum or similar material and are generally used to relieve electrical apparatus and transmission lines of lightning, excess potentials, surges and other abnormal potential strains.

An electrolytic cell, with aluminum electrodes immersed in a suitable electrolyte acts as a condenser, and enough leakage or capacity current flows through it when it is connected to a transmission line carrying alternating current at normal potential to cause some heating of the cell, and if excess potential appears a heavy flow of current and severe heating may occur. If the cell is of the type in which the electrolyte is held in trays which are nested one above the other to form receptacles open at the edges and partially filled with electrolyte, the trays being placed in an iron tank, a very heavy discharge through the arrester will cause the electrolyte to be thrown out of the trays and against the iron tank, thereby partially short circuiting the cell and producing other objectionable results. It has also been found desirable to use in connection with electrolytic cells some suitable insulating fluid, such as oil, to dissipate the heat generated in the cell and maintain all parts of the cell at a substantially uniform temperature, but this result is difficult to attain in cells of the usual type in which all parts of the electrodes are not in advantageous relation to the oil and the oil does not circulate freely.

The object of my invention is to provide a reliable and rugged form of electrolytic cell in which the electrolyte cannot come into contact with the walls of the tank containing the electrodes and in which oil or other insulating fluid may circulate freely in good thermal relation to the electrodes and thereby maintain all parts of the cell at a substantially uniform temperature.

In carrying out my invention, the electrodes are prefereably made in the shape of trays for holding the electrolyte and each tray is perforated in such a manner that oil or other insulating fluid will circulate through openings in the tray as well as around the edges of the tray thereby coming into contact with the greater part of the surface of the trays and rapidly abstracting heat from them. In the preferred construction, the trays are circular and are indented in the middle, thereby forming an annular trough for holding the electrolyte, each tray being perforated or cut away at a point on the indentation above the surface of the electrolyte to permit circulation of a cooling fluid through the tray. When formed in this way the trays will nest within one another, and are preferably assembled in such a manner that they are rigidly supported and separated from each other a short distance, the perforations or openings in the indentations preferably being in registry with each other to form a channel by means of which the oil can circulate through the middle of the trays. The trays are surrounded by a sleeve or shell of fiber or other insulating material which is spaced from the sides of the tank and the edges of the tray and not only intercepts any electrolyte projected from the trays and prevents it striking the walls of the tank, but also assists in circulating the oil.

My invention will best be understood in connection with the accompanying drawing of one of the various forms in which it may be embodied and which shows in cross section one form of electrolytic cell constructed in accordance with my invention.

The electrolytic cell or condenser shown in the drawing comprises a metal tank 1, provided with a terminal 2, which is to be connected to one lead of the circuit in which the electrolytic cell is to be included. The metal tank 1, which is nearly filled with oil, is open at the top, and is provided with a removable cover 3 on which is mounted an insulator 4 for supporting a terminal 5 which is to be connected to the other lead of the circuit. As shown in the drawing, the lower end of the terminal 5 is beneath the surface of the oil in the tank 1, and carries a conducting yoke 6 which engages the topmost tray or electrode of a stack of trays 7 which act as electrodes and contain the electrolyte.

While the trays or electrodes may be made in various forms, the preferred construction is that shown in the drawing in which each tray or electrode is circular, and is provided with sloping or conical walls 8, while the bottom is indented at the center to form a frustro-conical indentation 9 extending upward to a point above the level of the electrolyte 10. The indentation 9, which is perforated or cut away at a point above the level of the electrolyte to leave an opening 11, forms a passage or funnel through which the oil or other insulating fluid in the tank 1 may circulate. The walls 8 and the indentation 9 form an annular trough in which the electrolyte is placed, the level of the electrolyte being below the edge of the plate and also below the edge of the opening or perforation 11. The trays or electrodes are mounted substantially parallel to each other and at a short distance apart, and on account of their shape will nest as shown in the drawing.

Various means of supporting the trays or electrodes, and holding them in proper relation to each other may be used, but in the preferred construction the trays or electrodes are positioned on vertical rods 12 by means of holes near their edge and are separated from each other by insulating spacers or washers 13, which surround the rods 12 and hold the trays or electrodes at the proper distance from each other. The trays and insulating washers are clamped solidly in position by means of nuts 14 on the upper ends of the rods 12. The vertical insulating rods 12 are mounted on a notched metal ring or base 15 which rests on the bottom of the tank 1, and is provided with notches or openings 16 to permit free circulation of the oil or other insulating fluid in which the trays are submerged. Since both the edges of the trays and the central indentation are in contact with the oil, the heat is very rapidly drawn in both directions from the trays and the electrolyte and the cooling is much more effective and uniform than where solid trays are used.

In an electrolytic cell constructed as above described a very heavy discharge will cause some of the electrolyte 10 to be driven out of the trays and beyond the washers 13 into contact with the walls of the tank 1, thereby partially short circuiting the cell momentarily. In order to prevent this action and also to facilitate the circulation of the oil, I mount an insulating barrier, such as the fiber ring 17, between the edges of the trays and the walls of the tank with its bottom and top edges separated both from the trays and the walls of the tank to form open ended passages for the oil. In the specific arrangement shown the insulating barrier is mounted on brackets 18 secured to the base ring 15 and at its upper end is spaced from the walls of the tank by insulating projections or space blocks 19. The barrier 17 prevents electrolyte striking the walls of the tank and also permits the heated oil to ascend between the edges of the trays and the inside walls of the barrier while the cool oil descends in the passage between the outer wall of the barrier and the wall of the tank.

The passage of current from one terminal to the other through the electrodes 7 and the electrolyte 10 heats both the electrolyte and the electrodes. The heated oil or other insulating fluid in the tank 1 rises to the top of the tank through the central channel formed by the openings 11 which are preferably though not necessarily in registry with each other, and also rises in the channel between the edges of the plates and the barrier 17, while the cool oil between the barrier 17 and the walls of tank 1 flows down the walls of the tank and in through the openings 16, a continuous circulation of the oil being thereby maintained. Since both the central portion and the edges of the trays or electrodes are exposed to rising currents of oil, the cooling effect is marked and the temperature of the electrolyte and electrodes is kept uniform throughout and within the proper limits.

My invention may be embodied in many other forms than that shown and described and I therefore do not wish to be restricted to the precise arrangement disclosed, but intend to cover by the appended claims all changes and modifications within the spirit and scope of my invention.

What I claim as new and desire to secure by Letters Patent of the United States, is:—

1. An electrolytic cell comprising a tank containing insulating fluid, a plurality of liquid containing trays each shaped to provide a passage open at both ends and extending through the bottom of the tray to a point above the level of the liquid in the tray, and means for separating and supporting said trays in said tank at short distance from each other to permit circulation of the insulating fluid.

2. An electrolytic cell comprising a plurality of trays each having an opening through it and a trough for electrolyte encircling said opening, and means for supporting said trays from their edges whereby said openings are unobstructed.

3. An electrolytic cell comprising a tank containing insulating fluid, a plurality of nested fluid containing trays each having in the bottom an upwardly projecting indentation perforated above the level of the fluid in the tray, and means for supporting said trays in said tank to permit insulating fluid to circulate through said indentations.

4. In an electrolytic cell, the combination of electrodes shaped to form liquid containing trays, each having a frusto conical indentation with a perforation above the level of the liquid in said trays, and means for supporting said trays to leave said perforations unobstructed.

5. An electrolytic cell comprising a tank containing oil, a plurality of trays each having an upwardly extending indentation open at the top, insulating means for supporting said plates parallel to one another with the openings in said indentations unobstructed and substantially in alinement, and external terminals connected to the end trays.

6. An electrolytic cell comprising a tank containing oil, a plurality of annular fluid containing trays, insulating means in engagement with the edges of said trays to hold them parallel to one another beneath the oil and separated from the sides and bottom of said tank and an insulating barrier mounted between the edges of said trays and the walls of said tank for directing a circulation of oil across the lower edge of said barrier and over the edges of said trays.

7. An electrolytic condenser comprising a metallic container, a plurality of cup shaped electrodes arranged one within another and separated to leave a passage at their edges, and an insulating partition between the edges of said electrodes and said container.

8. An electrolytic condenser comprising a metallic container, a plurality of cup shaped electrodes arranged one within another and separated to leave a passage at their edges, an insulating envelop mounted to inclose said plates, and means for spacing said envelop from said plates and from said container.

9. An electrolytic condenser comprising a plurality of cup shaped electrodes arranged one within another, an oil bath for insulating the edges of said electrodes, and means immersed in said oil bath adjacent the edges of said electrodes for directing a current of oil over the edges of said electrodes.

10. An electrolytic condenser comprising a plurality of cup shaped electrodes arranged one within the other, an oil bath for insulating the edges of said electrodes, and a barrier submerged in the oil bath and mounted adjacent the edges of said electrodes.

11. An electrolytic condenser comprising a metallic container, a plurality of cup shaped electrodes arranged one within another, an oil bath for insulating the edges of said electrodes, and a vertical barrier spaced between the edges of said electrodes and the walls of said container and adapted to permit a free flow of oil across both its upper and its lower edges.

In witness whereof, I have hereunto set my hand this 30th day of August, 1909.

VICTOR E. GOODWIN.

Witnesses:
BENJAMIN B. HULL,
MARGARET E. WOOLLEY.